Aug. 12, 1958 W. H. GORDON, JR 2,847,547
VAPORIZER WITH STEAM GENERATOR
Filed May 28, 1957 2 Sheets-Sheet 1

Inventor:
Walter H. Gordon, Jr.
by Laurence R. Kempton
His Attorney.

Aug. 12, 1958  W. H. GORDON, JR  2,847,547
VAPORIZER WITH STEAM GENERATOR
Filed May 28, 1957  2 Sheets-Sheet 2

Inventor:
Walter H. Gordon, Jr.
by Laurence R. Kempton
His Attorney.

United States Patent Office 2,847,547
Patented Aug. 12, 1958

2,847,547

VAPORIZER WITH STEAM GENERATOR

Walter H. Gordon, Jr., Asheboro, N. C., assignor to General Electric Company, a corporation of New York Application May 28, 1957, Serial No. 662,255

7 Claims. (Cl. 219—38)

This invention relates to vaporizers and in particular, to steam type vaporizers.

One object of this invention is to provide a vaporizer which provides practically immediate steaming when placed in operation.

Another object of this invention is to meter the flow of liquid into the steam chamber whereby only a small amount of liquid must be heated to vaporization temperature at any one time.

Still another object of this invention is to prevent excessive water from entering the steam chamber when the vaporizer is assembled prior to being placed in use.

Other objects and advantages of my invention will become apparent as the following description proceeds, and the features of novelty which characterize my invention will be pointed out with particularity in the claims annexed to and forming a part of this specification.

In carrying out the objects of my invention in one form thereof, a vaporizer includes a liquid container of substantial capacity and a closure lid for sealing the container. The lid carries an enclosure defining a steam chamber with the heating element mounted therein. An opening or water inlet is provided adjacent the bottom wall of this steam chamber enclosure so that water may enter from the container to a level as defined by such opening, thereby to provide a limited volume of water in the steam chamber. If desired a medicament cup may be provided on the top of the steam chamber so that generated steam will pass through this cup and over a medicament compound.

Figure 1:
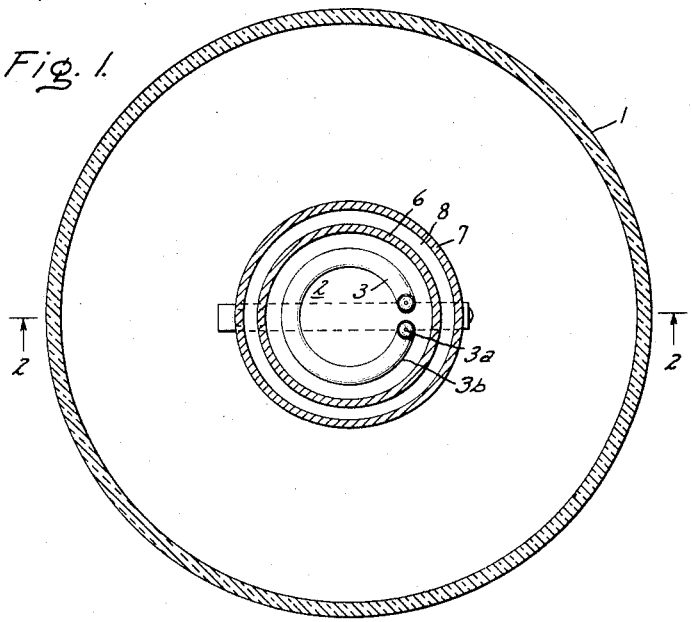
Fig. 1 is a sectional plan view taken along line 1—1 of Fig. 2.

Liquid vaporizers are particularly desirable for domestic use during the winter months when the air within the home is of relatively low humidity. It is well known that a relative humidity in the order of 40% to 60% is desirable. However, with heating systems as now used commonly, the relative humidity in a home during winter months may be actually in the order of 10%. In accordance with this invention, I provide an electrically operated device capable of operation over a substantial period of time for increasing the moisture content of the air.

Referring to the drawings, I have shown a preferred form of my invention wherein the vaporizer includes an outer container 1 of substantial volume, for example, one gallon. With a capacity of this order, a practical device may be provided for operation over an eight-hour period or longer without refilling. Obviously, larger capacities for container 1 could be employed if desired. With a quantity of water such as this, however, it becomes highly desirable to provide a means for vaporization which will not necessitate heating the entire quantity of liquid to the boiling point. For this purpose, I provide a water vaporization chamber 2 of a form adapted to be positioned within container 1. In the particular form shown, chamber 2 is defined by spaced tubular walls 6 and 7, the lower portion of the chamber being similarly closed by spaced bottom walls. The intermediate air space 8 functions as thermal insulation between steam generating chamber 2 and the liquid in the container and an air passage to container 1. Within steam generating chamber 2 is a heating element 3, preferably comprising an electrical resistor 3a sealed within an outer protective sheath 3b, with the electrical resistor insulated from the outer sheath in a well known manner.

In accordance with this invention, the steam generating chamber is so arranged with respect to the outer container that a limited quantity of liquid is present in the steam chamber regardless of the level of liquid in the outer container. As shown, passages or water inlet openings 10 and 10a extend through walls 6 and 7 adjacent the bottom wall of the steam chamber. These passages, of course, allow liquid to enter the steam chamber. However, to prevent the liquid from rising in the steam chamber to the same level as the liquid in the outer container, I provide means for sealing the outer container. As shown, outer wall 7 of the steam chamber includes an outwardly extending circular flange 9, adapted to rest on the upper edge of the outer container. Preferably, an appropriate sealing gasket 5 is interposed between flange 9 and the upper edge of container 1. Cover flange 9 and the sealing gasket may then be secured and sealed in assembled relation by a clamping ring 4, which typically includes a threaded engagement with the upper portion of the outer container. With a seal accomplished in this manner, additional liquid can flow from the outer container into the steam chamber only when air is allowed to pass through air space 8 and in the opposite direction through passage 10 into the outer container. Thus, during operation of this device, liquid level remains substantially at the level shown by dotted line 20.

Liquid enters chamber 2 through water inlet holes 10 and 10a and this liquid is then converted to vapor by heating element 3. The steam thus generated will rise and pass through outlet 11 in medicament cup 12 which is positioned on the top of inner tube 6. Power is supplied to heating element 3 by an electric cord 13 and an ordinary plug 14.

To operate the vaporizer, water is placed in container 1 until it reaches a level shown by line 15. When the desired amount of water is placed in container 1, gasket 5 is put in position on the top edge of container 1. Next, the steam chamber is placed within the container so that the flange 9 rests on gasket 5. The assembly is then sealed by tightening screw cap 4 on the lugs 16 which are formed on the upper outer edge of container 1.

To prevent excessive water from entering steam chamber 2 through inlets 10 and 10a when the vaporizer is being assembled prior to operation, suitable valve means may be employed to close this inlet until after the seal is completed at gasket 5. For example, I have shown a valve 17 mounted on the lower edge of outer tube 7 in any suitable manner. This valve 17 has a downwardly projecting section 18 which is arranged to contact the bottom of container 1 and the valve 17 is made of spring steel. When chamber 2 is lifted away from container 1, the valve will move downwardly so that valve member 19 will close inlet 10.

When chamber 2 is placed within container 1, projection 18 will contact the bottom of container 1 and move member 19 away from inlet 10, thereby allowing water to enter chamber 2. Preferably, valve portion 19 is moved to a full-open position as gasket 5 is compressed to establish the seal. Thereby, only a small amount of water will enter chamber 2 and to rise to a level shown at line 20. Furthermore, if the assembly of the vaporizer takes place quite rapidly, and gasket 5, steam chamber 2 and lid 4 are all placed on container 1 at the same time and the seal made is completed promptly, only a very small quantity of liquid will flow through passage 10, even though valve 19 may be partially or completely open prior to completion of the seal.

With only a small amount of water in chamber 2, steaming occurs quite rapidly. As the water in chamber 2 is converted to steam and thereby leaves the chamber, the water level shown by line 20 will fall. As this water level falls below the top edge of inlet 10, air will pass down through air space 8, through inlet 10 and the water into container 1. This action will thereby increase the pressure in container 1 and allow more water to enter chamber 2 through inlets 10 and 10a until line 20 is again reached.

During operation of this vaporizer it can be seen that only a small amount of water will be in chamber 2 at any one time. It is necessary that some of this water be boiled away before more water may enter chamber 2. To prevent a rush of water into chamber 2 when the vaporizer is being assembled prior to operation, a valve with closure member 19 is provided to close inlet 10 until that time when the vaporizer is completely assembled and container 1 is sealed from the atmosphere. In this manner, I have achieved a valve device to be used in conjunction with a rapid steaming vaporizer in which the valve prevents large amounts of water from entering chamber 2 during the time when the vaporizer is being assembled for operation.

Figure 3:
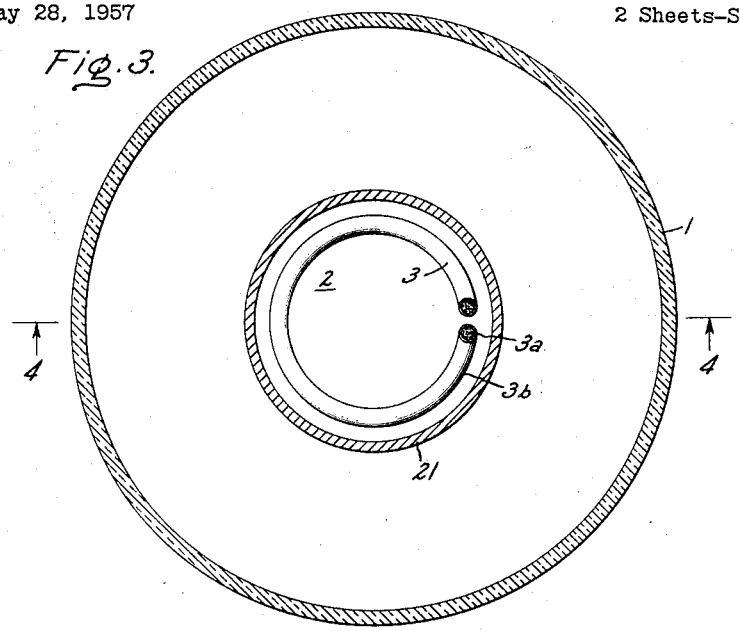
Fig. 3 is a sectional plan view of a modified form of this invention taken along line 3—3 of Fig. 4.
Figure 4:
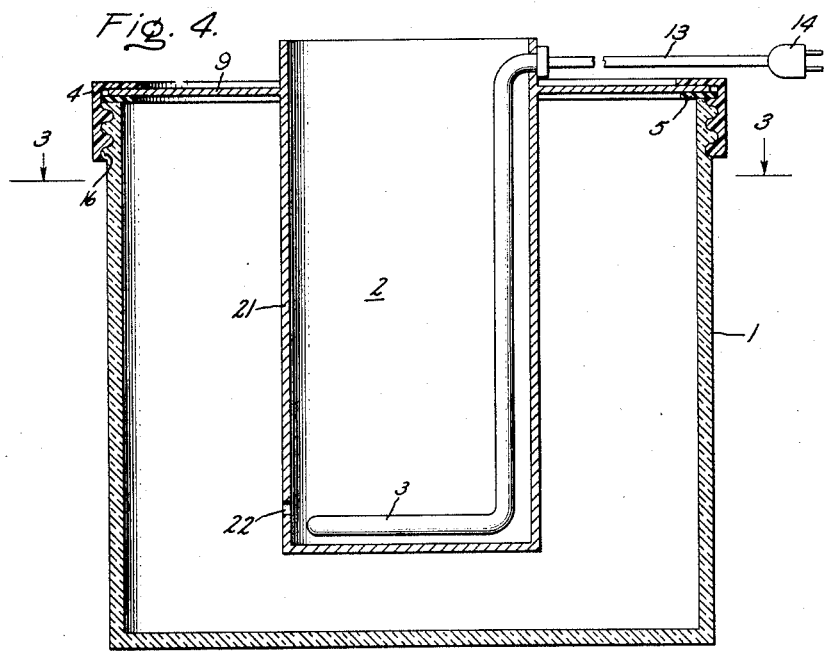
Fig. 4 is a sectional elevation view of the modification of Fig. 3 taken along line 4—4 of Fig. 3.

In Figs. 3 and 4, I have shown a second form of my invention wherein the vaporizer includes an outer container 1 of substantial volume. In this form I provide a water vaporization chamber 2 of a form adapted to be positioned within container 1. Chamber 2 is defined by tubular wall 21 and is closed by a bottom wall. Heating element 3 is positioned within chamber 2 and preferably comprises an electrical resistance 3a sealed within an outer protective sheath 3b with the electrical resistor insulated from the outer sheath in any well-known manner.

Figure 2:
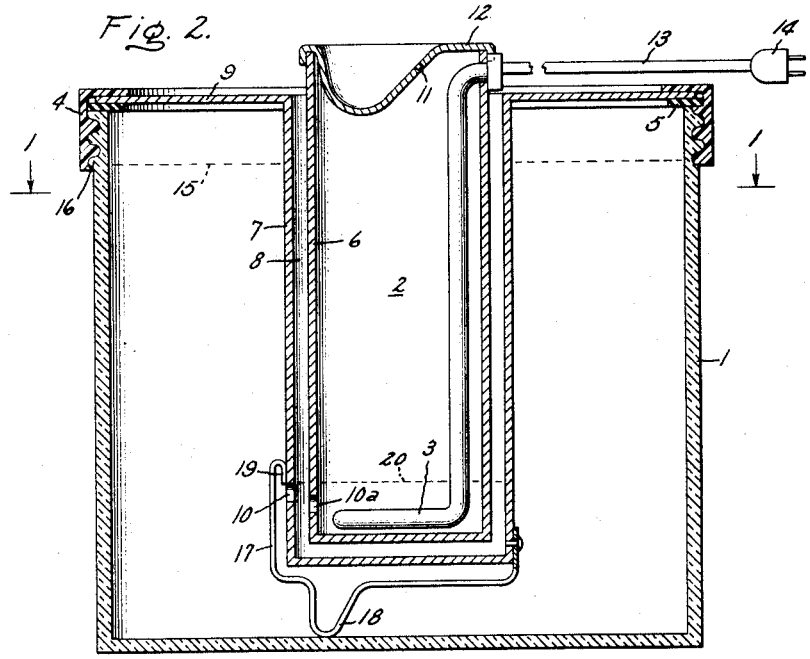
Fig. 2 is a sectional elevation view taken along line 2—2 of Fig. 1.

As shown in Fig. 4, a passage or water inlet opening 22 extends through wall 21 adjacent the bottom wall. This passage will allow liquid in container 1 to enter chamber 2. As in the case of the embodiment shown in Figs. 1 and 2, I provide means for sealing the outer container. Wall 21 of the steam chamber includes an outwardly extending circular flange 9 adapted to rest on the upper edge of the outer container. A sealing gasket 5 is interposed between flange 9 and the upper edge of container 1 and a clamping ring 4 which includes a threaded engagement with the upper portion of the container secures cover flange 9 and the sealing gasket in assembled relationship. When the seal is accomplished in this manner, liquid can flow from container 1 into chamber 2 only when air is allowed to pass through opening 22 in the opposite direction into container 1. In this embodiment, I prefer to leave the steam chamber open, however, a medicament cup, such as that shown in Fig. 2 may be positioned on the top of tube 21 if desired.

In order to prevent excessive water from entering chamber 2 through opening 22 when the vaporizer is being assembled prior to operation, water inlet 22 is quite small so that only a very slight amount of liquid can enter chamber 2 during the assembly of the vaporizer. Therefore, with only a small amount of water in chamber 2, steaming occurs quite rapidly. As the water in a chamber 2 is converted to steam, and passes out of this chamber, the water level will drop and when the water level drops below the upper edge of inlet 22, air will pass from chamber 2 through opening 22 into container 1. This action increases the pressure in container 1, allowing more water to enter chamber 2 through inlet 22 until the water in chamber 2 reaches the upper edge of inlet 22. Therefore, during operation of the vaporizer it can be seen that only a small amount of water will be in the steam chamber at any one time. It is necessary that a portion of this water boil away before more water will be allowed to enter chamber 2 by the action previously described.

While I have shown and described specific embodiments of my invention, I do not desire my invention to be limited to the particular constructions shown and described, and I intend by the appended claims to cover all modifications within the spirit and scope of my invention.

What I claim as new and desire to secure by Letters Patent of the United States is:

1. A steam vaporizer comprising an outer water container, an inner container defining a steam chamber and having outer and inner side and bottom wall means and outwardly extending flange means forming a cover for said water container, an aperture through said side wall means of said inner container adjacent said bottom wall thereof, a heating element within said inner container having the major portion thereof below said aperture, sealing and clamping means for securing said cover to said water container and for establishing an enclosed vacuum space within said water container, air being permitted to enter said vacuum space only through said aperture when the water level in said inner container is below said aperture, a normally closed valve for said aperture mounted on said inner container, means opening said valve when said cover is clamped into position, and a medicament cup removably positioned on said inner container with a steam aperture therein.

2. A liquid vaporizer comprising an outer container for liquid, a cover including a vapor chamber depending therefrom, said vapor chamber being within said outer container and having enclosing side wall means and a bottom wall, means defining an inlet into said vapor chamber through said side wall means adjacent said bottom wall, a heating element within said vapor chamber adjacent said bottom wall, and means effecting a seal between said cover and said outer container whereby liquid enters said vapor chamber through said inlet to a level defined by the upper portion of said inlet.

3. A liquid vaporizer comprising an outer container for liquid, a cover including a vapor chamber depending therefrom, said vapor chamber being within said outer container and having enclosing side wall means and a bottom wall, means defining an inlet into said vapor chamber through said side wall means adjacent said bottom wall, a heating element within said vapor chamber having at least a portion thereof below said water inlet, and means effecting a seal between said cover and said outer container whereby liquid enters said vapor chamber through said inlet only to the extent that air enters said outer container through said inlet.

4. A liquid vaporizer comprising an outer container for liquid, a cover including a vapor chamber depending therefrom, said vapor chamber being within said outer container and having enclosing side wall means and a bottom wall, means defining an inlet into said vapor chamber through said side wall means adjacent said bottom wall, thermal insulation between said vapor chamber and said outer container, a heating element within said vapor chamber adjacent said bottom wall and means effecting a seal between said cover and said outer container whereby liquid enters said vapor chamber through said inlet to a level defined by the upper portion of said inlet.

5. A liquid vaporizer comprising an outer container for liquid, a cover including a vapor chamber depending therefrom, said vapor chamber being within said outer container and having enclosing side wall means and a bottom wall, means defining an inlet into said vapor chamber through said side wall means adjacent said bottom wall, thermal insulation between said vapor chamber and said outer container, a heating element within said vapor chamber having at least a portion thereof below said water inlet and means effecting a seal between said cover and said outer container whereby liquid enters said vapor chamber through said inlet only to the extent that air enters said outer container through said inlet.

6. A liquid vaporizer comprising an outer container for liquid, an inner container within said outer container, means defining an inlet in said inner container adjacent the bottom thereof, a heating element within said inner container having at least a portion below said inlet, a cover for said outer container and means effecting a seal between said outer container, said inner container and said cover, whereby liquid enters said inner container through said inlet only to the extent that air enters said outer container through said inlet.

7. A steam vaporizer comprising an outer water container, an inner container defining a steam chamber and having outer and inner side and bottom wall means and outwardly extending flange means forming a cover for said water container, a first aperture through said inner side wall means of said inner container adjacent said bottom wall thereof, a second aperture through said outer side wall means of said inner container, a heating element within said inner container having the major portion thereof below said aperture, sealing and clamping means for securing said cover to said water container and for establishing an enclosed vacuum space within said water container, air being permitted to enter said vacuum space only through said second aperture when the water level in said inner container is below said second aperture, a normally closed valve for said second aperture mounted on said inner container, means opening said valve when said cover is clamped into position, and a medicament cup removably positioned on said inner container with a steam aperture therein.

References Cited in the file of this patent

UNITED STATES PATENTS

| | | |
|---|---|---|
| 1,988,790 | Gross | Jan. 22, 1935 |
| 2,062,613 | Schleimer | Dec. 1, 1936 |
| 2,454,657 | Kuzmin et al. | Nov. 23, 1948 |